US006707807B1

(12) United States Patent
Menzel

(10) Patent No.: US 6,707,807 B1
(45) Date of Patent: Mar. 16, 2004

(54) RECEPTION TIME OF MESSAGES IN ACCESS CHANNELS OF TDMA MOBILE COMMUNICATION SYSTEM CONTROLLED BY TRANSMITTING DEVICE

(75) Inventor: Christian Menzel, Maisach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/446,059
(22) PCT Filed: Jun. 16, 1998
(86) PCT No.: PCT/DE98/01631
§ 371 (c)(1),
(2), (4) Date: Jun. 16, 1999
(87) PCT Pub. No.: WO98/58504
PCT Pub. Date: Dec. 23, 1998

(30) Foreign Application Priority Data

Jun. 17, 1997 (DE) .......................................... 197 25 569

(51) Int. Cl.[7] .................................................. H04J 3/00
(52) U.S. Cl. ........................ 370/337; 370/335; 370/336; 370/312; 370/314; 370/442; 370/350; 455/434; 455/466
(58) Field of Search .............................. 455/434, 466, 455/422; 370/329, 337, 345, 347, 442, 465, 468, 310, 312, 313, 341, 334–336, 431, 432, 441, 328–330, 350; 375/347, 349

(56) References Cited

U.S. PATENT DOCUMENTS

| | | | | |
|---|---|---|---|---|
| 4,736,371 A | * | 4/1988 | Tejima et al. ................ | 370/236 |
| 5,012,469 A | * | 4/1991 | Sardana ....................... | 370/322 |
| 5,299,235 A | * | 3/1994 | Larsson et al. .............. | 375/365 |
| 5,544,196 A | * | 8/1996 | Tiedemann et al. ......... | 375/145 |
| 5,621,770 A | * | 4/1997 | Zastera ........................ | 375/347 |
| 5,850,392 A | * | 12/1998 | Wang et al. ................. | 370/335 |
| 5,862,132 A | * | 1/1999 | Blanchard et al. .......... | 370/342 |
| 5,905,721 A | * | 5/1999 | Liu et al. ..................... | 370/342 |
| 6,078,574 A | * | 6/2000 | Boetzel et al. .............. | 370/337 |
| 6,097,772 A | * | 8/2000 | Johnson et al. ............. | 375/346 |
| 6,154,457 A | * | 11/2000 | Vayrynen ..................... | 370/350 |
| 6,185,196 B1 | * | 2/2001 | Mademann ................... | 370/327 |
| 6,535,497 B1 | * | 3/2003 | Raith ........................... | 370/336 |

FOREIGN PATENT DOCUMENTS

| | | |
|---|---|---|
| DE | 44 02 903 A1 | 8/1995 |
| DE | 195 24 659 C1 | 10/1996 |
| DE | 195 34 156 C1 | 10/1996 |

* cited by examiner

Primary Examiner—Nay Maung
Assistant Examiner—Sujatha Sharma
(74) Attorney, Agent, or Firm—Staas & Halsey LLP

(57) ABSTRACT

In methods for signal transmission, a first radio burst is inventively transmitted in a time slot of the radio interface, in which a transmission-side synchronization of the transmission of the first radio burst occurs, so that the first radio burst arrives at the receiving radio station at a predetermined point in time within the time slot. At least one second radio burst that can be interpreted separately from the first radio burst is transmitted in the same time slot. The invention can be utilized for designing the access method (random access) in packet data services (GPRS) of the GSM mobile radio telephone system or in a TDD transmission mode of the third mobile radio telephone generation. This method may also be used to transmit many very short messages.

14 Claims, 5 Drawing Sheets

GPRS-K

RECEPTION TIME OF MESSAGES IN ACCESS CHANNELS OF TDMA MOBILE COMMUNICATION SYSTEM CONTROLLED BY TRANSMITTING DEVICE

BACKGROUND OF THE INVENTION

1. Field of the Invention

The invention is directed to a method, to a mobile station and to a base station for signal transmission via a radio interface between radio stations of a time division multiple access (TDMA) mobile communication system.

2. Description of the Related Art

Mobile communication systems serve for the transmission of data with the assistance of electromagnetic waves via a radio interface between a transmitting and a receiving radio station, in which one of the radio stations is usually not stationary. The known GSM mobile radio telephone network (Global System for Mobile Communications) is an example of a mobile communication system, in which a channel respectively formed by a narrow band frequency range and a time slot is provided for the transmission of a subscriber signal. Since a subscriber signal in a channel is separated from other subscriber signals in frequency and time, the receiving radio station can undertake a detection of the data of this subscriber signal. Due to the formation of time slots, a time-division multiplex subscriber separation and, thus, a TDMA (time division multiple access) mobile communication system is present.

The network-side radio station of a mobile radio telephone network is a base station that communicates with mobile stations via a radio interface. The transmission from a mobile station to the base station is referred to as the upstream direction and the transmission from the base station to a mobile station is referred to as the downstream direction. A channel is formed by at least one time slot per time-division multiplex frame. A plurality of time-division multiplex frames thereby form a macro frame. Furthermore, the carrier frequency and, potentially, a frequency discontinuity sequence identify the channel.

Connection-oriented concepts and concepts on the basis of logical connections can be accessed for the transmission of data between two communication terminal devices. For connection-oriented data transmissions, physical resources between the two communication terminal equipment must be offered during the entire time of the data transmission.

A permanent offering of physical resources is not necessary for a data transmission via logical connections. One example of such a data transmission is packet data transmission. A logical connection between the two communication terminal devices is present for packet data transmission over the duration of the entire data transmission; however, physical resources are only offered during the actual transmission times of the data packets. This method is based on this principle in that the data are communicated in short data packets between which longer pauses can occur. The physical resources are available for other logical connections in the pauses between the data packets. Physical resources are thus saved when utilizing such a logical connection.

The packet data transmission method disclosed by German Letters Patent DE 44 02 903 A1 is particularly available for communication systems having limited physical resources. For example, in mobile radio telephone systems such as the GSM mobile radio telephone system, the physical resources of the radio interface, i.e., the radio-oriented resources, in the frequency domain—the number of frequency bands and time slots—are limited and must be rationally utilized.

When a data transmission from a mobile station in a waiting condition to the network is desired, i.e., in the upstream direction, this mobile station will express an access request that is interpreted by the network. To accomplish this, channels in which signaling messages required for an arbitrary access that could not be previously planned but in which no payload data are transmitted, are provided within the packet data channel for access.

The access request is expressed by what is referred to as an access burst (random access burst) that is shortened in comparison to normal radio bursts so that a reception can also proceed without time synchronization of the radio stations. This access burst is always abbreviated. Regardless of the condition of the mobile station no precautions are taken for influencing the transmission point in time for the access burst. Each mobile station arbitrarily selects this transmission point in time within the time slot.

SUMMARY OF THE INVENTION

The invention is based on the object of specifying an improved method and improved devices for signal transmission of a TDMA mobile communication system that more effectively use the radio-oriented resources of the radio interface.

This object is achieved by transmitting a first radio burst in a time slot, performing a transmission-side synchronization of this transmission so that this burst arrives at a receiver at a predetermined point in time within the time slot, and transmitting a second radio burst in the same time slot in a manner where the second burst can be evaluated separately from the first burst.

This object can also be achieved by transmitting a first radio burst that is shorter with respect to other radio bursts as an access burst in a time slot, and performing a transmission-side synchronization of the transmission.

Furthermore, a mobile station may be used which has a transmitter/receiver for transmitting and receiving radio bursts, a signal processor for generating a first radio burst or a second radio burst, a controller for synchronizing the transmission of the first radio burst within a time slot and for triggering the transmission of the first radio burst. This mobile station may be used with further mobile stations for sending a second radio burst(s), and a base station that interprets the second radio burst separately from the first radio burst within the same time slot, in which the controller synchronization leads to a predetermined reception point in time within the time slot at the base station.

Finally, the object of the invention may also be realized using a base station having a receiver for receiving two time-separable radio bursts sent in a time slot from different mobile stations and a signal evaluator for separating and processing these radio bursts. Advantageous developments of the invention can be derived from the discussion below.

In methods for signal transmission, a first radio burst is inventively transmitted in a time slot of the radio interface, in which a transmission-side synchronization of the transmission of the first radio burst takes place, so that the first radio burst arrives at the receiving radio station at a predetermined point in time within the time slot. At least one second radio burst that can be evaluated separately from the first radio burst is transmitted in the same time slot. A corresponding subdivision of a time slot creates the possibility of transmitting a greater quantity of data and, thus, of using the radio-oriented resources more effectively. A time slot is thus allocated to not only one mobile station but can be used by a plurality of mobile stations independently of one another. Due to the transmission-side synchronization, it can be assured that the radio bursts do not arrive simultaneously in the time slot and can thus be separately evaluated. Not all time slots of the TDMA radio communication system are fashioned in this way; rather, the subdivision into two separate radio bursts that could derive from different transmitters or that may be intended for different receivers is enabled only for individual time slots within a frame.

According to a development of the invention, the radio bursts transmitted in a time slot have the same length. A plurality of standardized block lengths is thus introduced which fill up a time slot such that optimally few unused transmission times arise and a time slot is filled with two, three or more radio bursts as needed. A great number of very short messages can thus be transmitted. This method can be relevantly applied in mobile radio telephone systems of the third generation such as, universal mobile telecommunications services (UMTS).

Alternatively, when different types of radio bursts are transmitted in a time slot, then mixed payload and signaling information can also be transmitted in a time slot. Existing standardized radio bursts need not be adapted, yet additional radio bursts can be transmitted in the remaining time of the time slot. A very flexible radio interface thus arises that can offer new services with the additional, second radio bursts, without having to make further radio-oriented resources available.

The inventive method encounters an especially advantageous application for radio stations that are formed by base stations and mobile stations, in which the first radio burst is an abbreviated radio burst compared to other radio bursts. Poor utilization of the radio-oriented resources of the radio interface exist, particularly for abbreviated radio bursts, this situation has not been improved since the detectability of the radio bursts dominated.

When the mobile communication system is a GSMA mobile radio telephone network and the first radio burst is what is referred to as an access radio burst, then only approximately half of a time slot is filled and the unutilized portion can be exploited by the inventive method.

The invention can also be described by a method for signal transmission via a radio interface between mobile stations and a base station of a TDMA mobile communication system. In this method, a first, abbreviated radio burst is transmitted in the upstream direction as an access burst in a time slot of the radio interface, following a transmission-side synchronization, and arriving at the receiving radio station at a predetermined point in time within the time slot.

The access bursts are significantly shorter than the time slots and have previously not been synchronized since one wished to accord the mobile stations fast access at any time even in the non-synchronized condition. What this fails to recognize, however, is that given a packet data transmission, for example, the mobile stations are already synchronized in the standby condition. The point in time of the arrival of an access burst at the base station is thus also predictable, and the remaining time of a time slot can be used in some other way, for example, for measuring the channel using the base station, for lengthening the access burst, for shutting the receiver off or for transmission of a second radio burst.

The transmission of the radio bursts is advantageously synchronized such that the points in time of the arrival of the radio bursts need two radio bursts that essentially do not overlap. A significantly simpler distortion correction and decoding is thus possible. Minute overlaps caused by multipath propagation can, however, be tolerated.

Advantageously, the point in time of the arrival of the first radio burst is oriented to the start of the time slot. The values of time compensation, the timing advance, that have already been determined can thus be accepted and additional calculating effort is not necessary.

BRIEF DESCRIPTION OF THE DRAWINGS

The invention is explained in greater detail below with reference to graphic illustrations on the basis of exemplary embodiments.

Thereby shown are.

DETAILED DESCRIPTION OF THE PREFERRED EMBODIMENT

Figure 1:
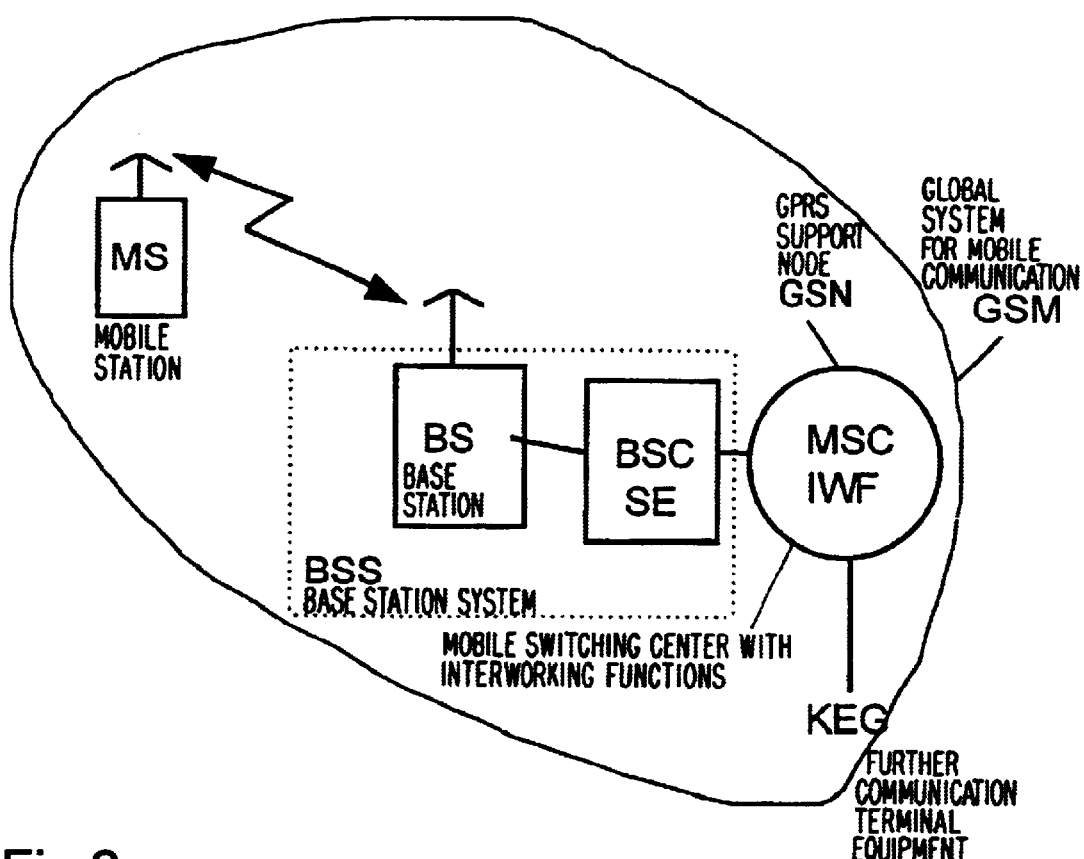
FIG. 1 is a block circuit diagram of a TDMA mobile communication system for packet data transmission.

An exemplary time-division multiplex mobile radio telephone system is shown in FIG. 1 which has a GSM mobile radio telephone network GSM that contains at least one base station system BSS with a base station controller BSC and a base station BS. Mobile stations MS are located in the coverage area of the one base station BS that is shown. The base station system BSS produces the connection to further devices of the GSM mobile radio telephone network GSM. A controller SE is implemented in the base station controller BSC, which allocates radio-oriented resources for the mobile stations MS. The controller SE, however, can also be realized in other devices of the mobile radio telephone system.

These other devices can include the mobile switching center MSC and a unit for realizing interworking functions IWF. The collaboration of the mobile switching center MSC and interworking functions IWF yields a packet exchange that is also referred to as a GSN (GPRS support node). This packet exchange is connected to a mobile switching center MSC for voice switching; alternatively, it can be realized as a remote, separate unit.

The GSM mobile radio telephone network GSM can be connected to further communication networks. For example, a further communication terminal equipment KEG is connectable to the GSM mobile radio telephone network via a fixed network or is itself a component part of this GSM mobile radio telephone network GSM.

The GSM mobile radio telephone network GSM can be used for packet data transmission parallel to the known voice transmission. The mechanism used for realizing interworking functions IWF can thereby produce the coupling of the GSM mobile radio telephone network GSM to data transmission networks and, thus, to the further communication terminal equipment KEG.

Figure 2:
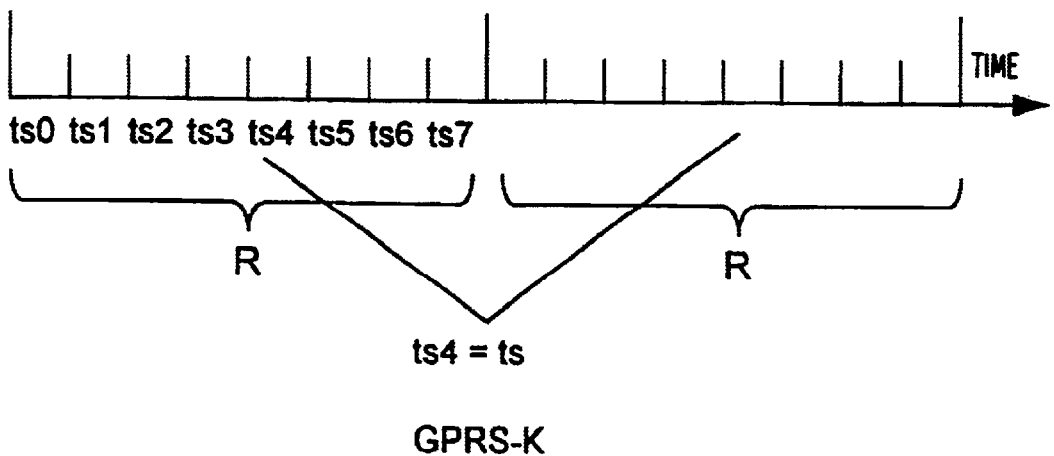
FIG. 2 is a timing diagram illustrating a channel with time-division multiplex subscriber separation.

The radio interface between the mobile stations MS and a base station BS is characterized by a frequency band and at least one time slot ts. According to FIG. 2, for example, eight time slots is (ts0 through ts7) are combined to form a frame R. The frame R repeats cyclically, within which a recurring time slot, for example the time slot ts=ts4, belongs to a channel. This time slot ts is employed below as channel GPRS-K for the packet data transmission in the sense of the service GPRS (General Packet Radio Services). A plurality of time-division multiplex frames R can be combined to form a macro frame.

When a mobile station MS is to use this service, then, in conformity with the GSM terminology, it implements a random access with a short access burst and changes to a dedicated control channel. An authentification and the setting of the context follow, for example, a temporary identifier (TLLI) with respect to a logical connection (standby state). When the further communication terminal equipment KEG is to communicate with a mobile station MS via the packet data service, a paging of the desired mobile station MS as well as the described random access for changing into the standby state occur at the network side.

For sending packet data in the upstream direction, the mobile station MS in turn sends an access burst on the control channel, after which the mobile station MS is informed of an abbreviated identifier, a GPRS channel GPRS-K and the timing advance that is determined from the access burst and is to be employed in the GPRS channel GPRS-K. Thereafter, the mobile station MS is in this state; in this state, further access bursts for updating the timing advance are sent at intervals of 1 through 2 s. When the mobile station MS subsequently wishes to transmit data in the upstream direction, an access burst (for example, the second radio burst fb2 described below or a following access burst for the timing advance) is sent again, this being interpreted by the controller SE, and corresponding radio-oriented resources being allocated as soon as possible.

Figure 3:
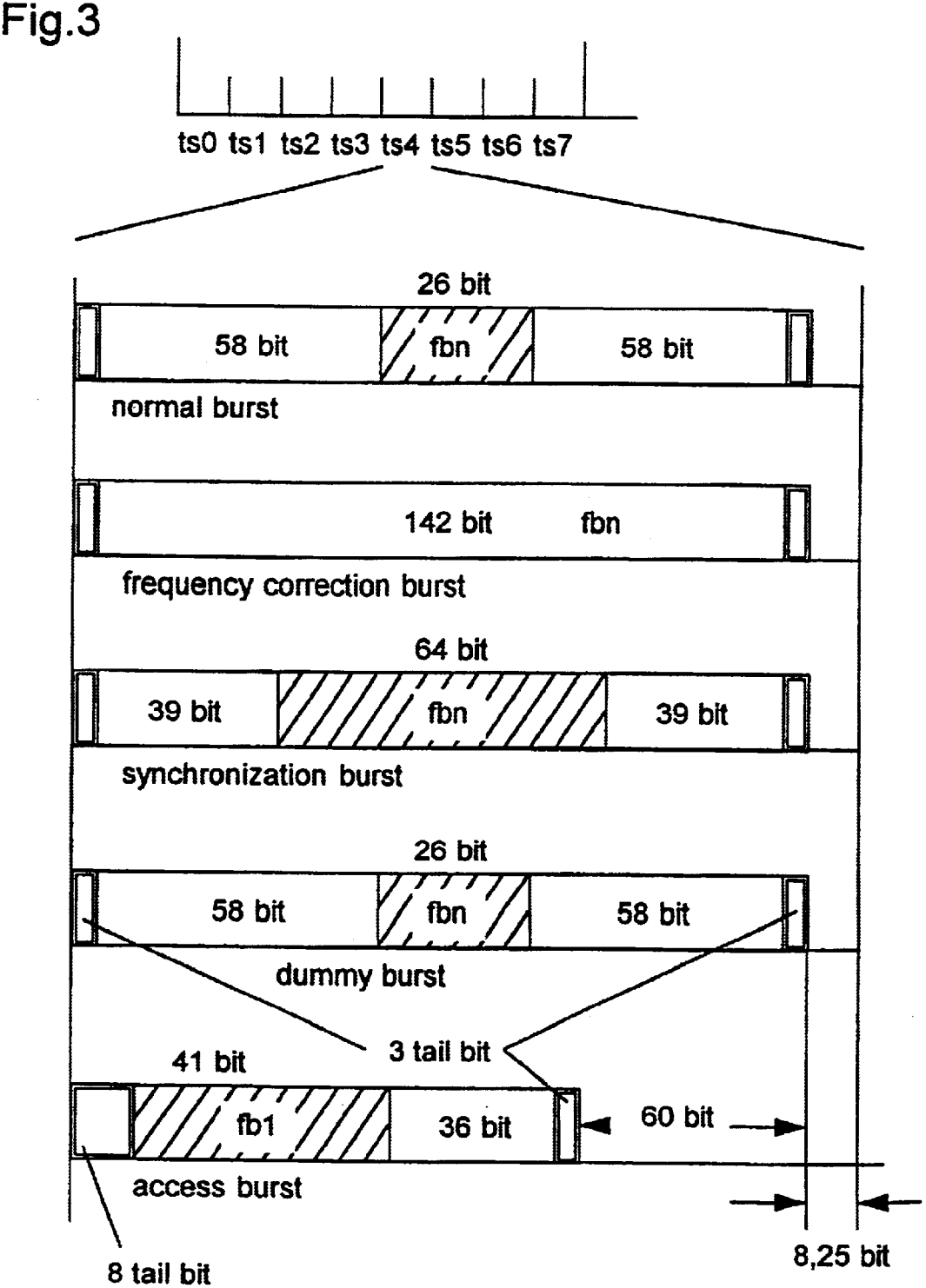
FIG. 3 is a schematic illustration of radio burst types used in the GSM mobile radio telephone network.

FIG. 3 shows the types of radio bursts that are standard in the GSM mobile radio telephone network in which only one radio burst is always transmitted per time slot ts, for example ts4. A radio burst is initiated and ended by 3 bits that serve for the transient response and transient decay of the distortion correcting mechanism and other assemblies. A protection time of 8.25 bits within the time slot ts4 remains unused and forms the compensation for possible running time differences that cannot be leveled out between radio bursts of different time slots ts4, ts5.

A normal radio burst fbn contains two times 58 bits of payload information into which a training sequence of 26 bits is embedded in the middle. A radio burst fbn for frequency correction contains a sequence of 142 known bits; a radio burst fbn for synchronization contains two parts of 39 bits each and a lengthened training sequence of 64 bits. A dummy burst fbn is constructed according to the normal radio burst fbn.

Furthermore, a first radio burst fb1 is shown, which has an introduction of 8 bits and a subsequent 41 bit training sequence and 36 bits of payload information. The protection time for the access burst fb1 is thereby extended to a total of 68.25 bits. 60 bits are thus available for at least one second radio burst fb2, as indicated below. The access burst fb1 is abbreviated since it is provided in the GSM mobile radio telephone network for situations in which a reliable reception is required despite unknown signal running times and, thus, imprecise transmission points in time.

Figure 4:
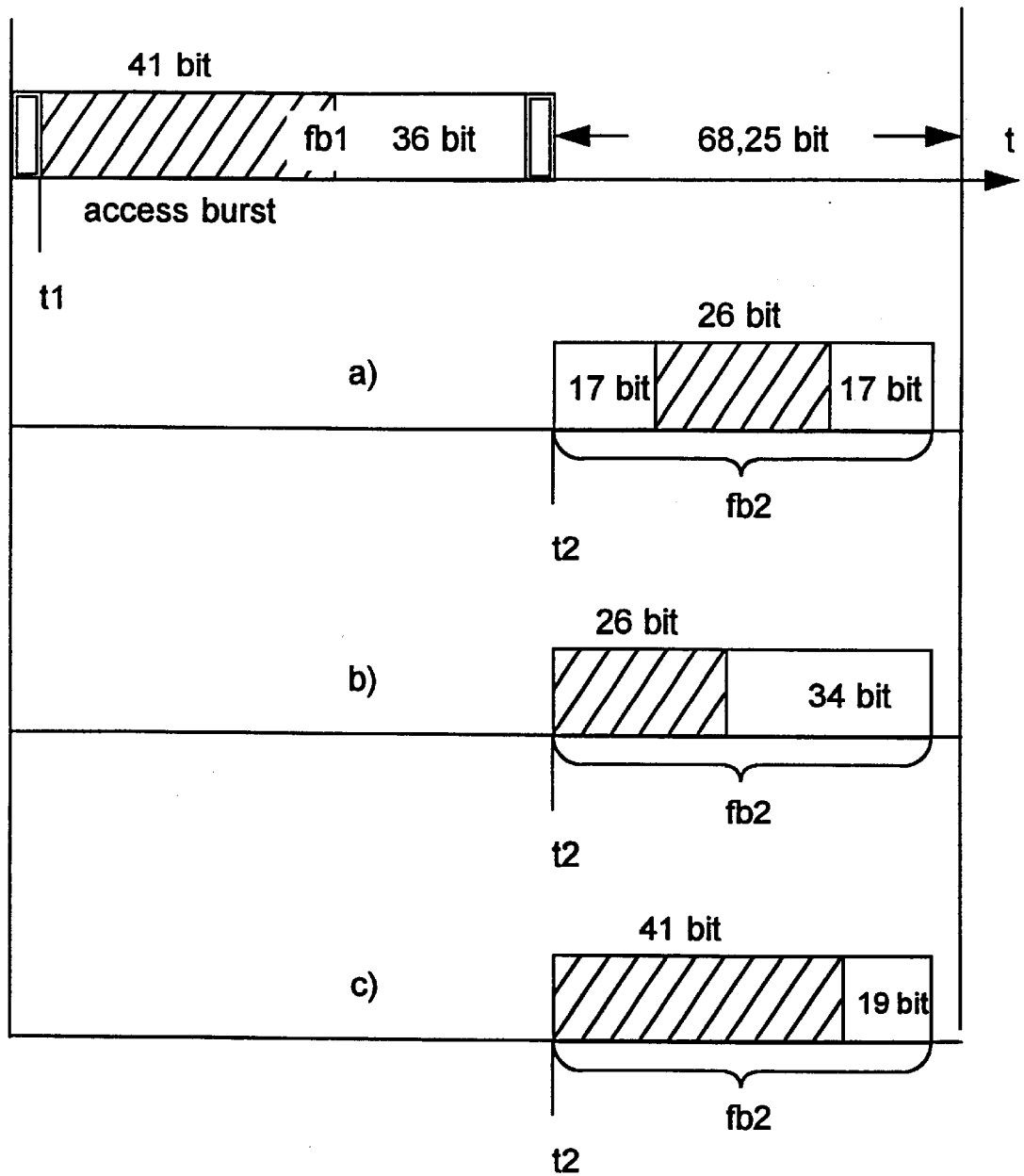
FIG. 4 is a schematic illustration of the structure of a second radio burst when the first radio burst is an access burst.

By way of example, FIG. 4 shows three versions for setting up a second radio burst fb2 for filling up the time slot ts4. The arrival of the radio bursts fb1 and fb2 at the receiver is identified by two points in time t1 or t2 that, after determining timing advances, are set by the synchronization of the transmitting mobile station MS. The radio bursts fb1, fb2 do not overlap.

The second radio burst fb2 according to FIG. 4(a) contains a normal training sequence of 26 bits and two data blocks of 17 bits each. According to FIG. 4(b), a data block having 34 bits is preceded by a training sequence having 26 bits. In the meantime, the training sequence in FIG. 4(c) is lengthened to 41 bits and, thus, a data block of only 19 bits follows, making the length of the second radio burst fb2 60 bits. However, other radio burst lengths are possible. For example, the second radio burst fb2 can in turn be introduced or ended by one or more bits. It is likewise possible to lengthen or shorten the protection time toward the end of the time slot.

Payload and signaling information, such as requests for an allocation of radio-oriented resources in the upstream direction or other signaling information or data within a short message service, can be additionally transmitted in the data blocks of the second radio bursts fb2. The data rate of the radio cell is thus increased in the upstream direction.

Alternatively to transmitting a second radio burst fb2, the lengthened protection time could also be used for a lengthened access burst fb1. It is likewise possible to use this protection time for shutting off or for switching into an energy-saving mode at the transmission of the reception side. Particularly at the reception side, the pre-conditions for this switching are established due to the knowledge of the point in time t1 of the arrival of the access burst fb1 and, thus, of the point in time of the end of the access burst fb1 as well. Furthermore, the possibility of communication of the mobile stations MS with one another is also established.

Figure 5:
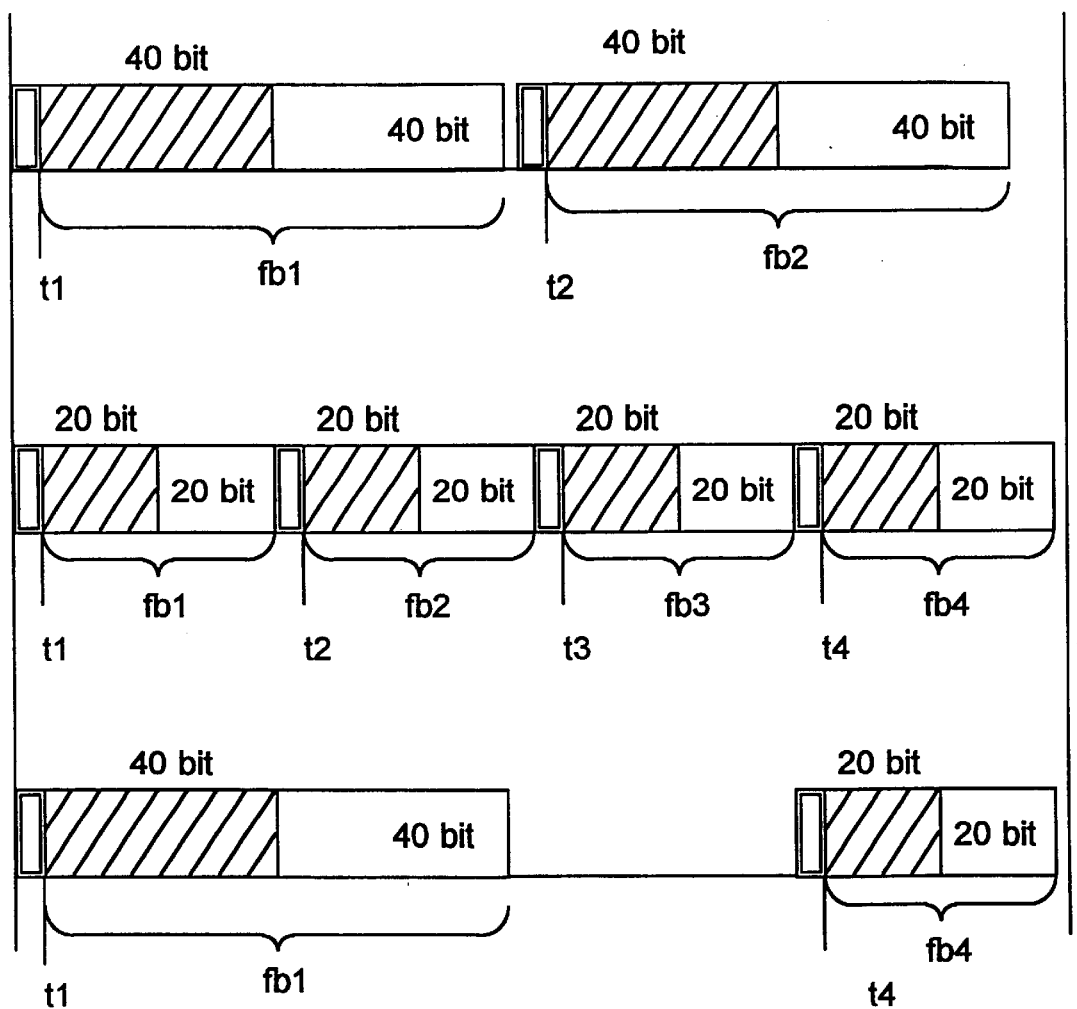
FIG. 5 is a schematic illustration of radio bursts of the time slot.

FIG. 5 shows a time slot of a TDMA mobile communication system, in which the length of the radio bursts fb1, fb2, fb3, fb4 is matched such that one or more radio bursts of identical or different length can be transmitted in steps. This structure limits the plurality of different types of radio bursts to permit a better evaluation. As a result of this structure, the data rate can be set in steps in the upstream or the downstream direction. The illustrated division of the radio bursts fb1, fb2, fb3, fb4 into 40 or 20 bit training sequence and 40 or 20 bit payload data can thus be variably set. The same is true of the protection times between the radio bursts fb1, fb2, fb3, fb4 or of the introduction times. The radio bursts fb1, fb2, fb3, fb4 can thus be sent from one or different radio stations MS, BS.

Figure 6:
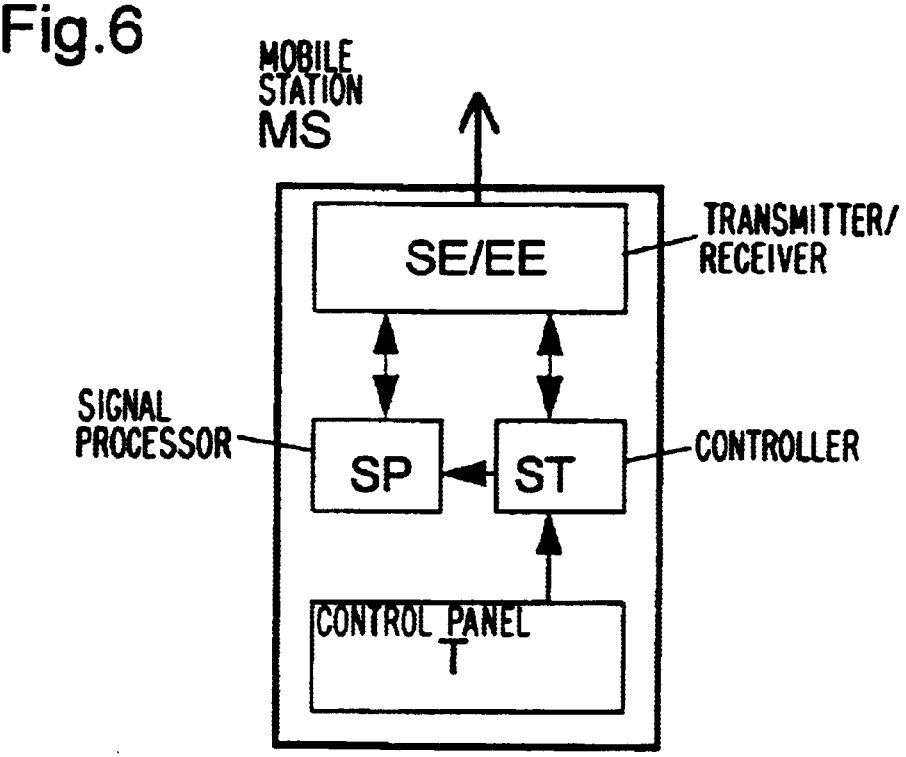
FIG. 6 is a block circuit diagram of a mobile station.
Figure 7:
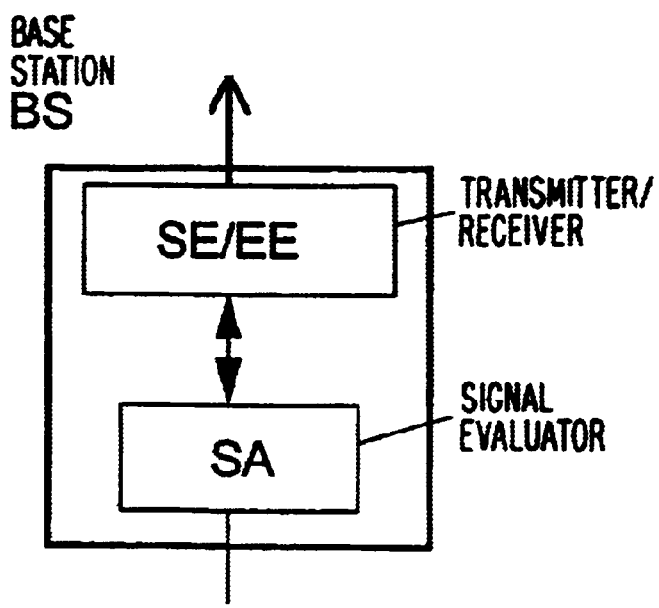
FIG. 7 is a block circuit diagram of a base station.

The mobile station MS of FIG. 6 contains a control panel T, a signal processor SP, a controller ST and a transmitter/receiver SE/EE. The subscriber can generate inputs at the control panel T, including an input for sending a data packet with the data packet service GPRS. An access burst fb1 is formed in response to this input in the signal processor SP, and the time slot ts and, based on the predetermined timing advance, the transmission point in time are selected in the controller ST. The access burst fb1, following a corresponding signal editing, is sent narrow band and synchronized in the selected time slot is by the transmitter SE. The same or a different mobile station MS can, again proceeding from the signal processor SP and the controller ST, send a second radio burst fb2 in the same time slot ts.

The base station BS contains a transmitter/receiver SE/EE that amplifies the reception signals, converts them into the base band and demodulates them. In an analog-to-digital converter, the reception signals are converted into symbols having discrete values set, such as digits. The access bursts fb1 and the second radio bursts fb2, fb3, fb4 are separated and processed as well in the signal evaluator SA that might be fashioned as a digital signal processor.

The payload and signaling information of the radio bursts fb1, fb2, fb3, fb4 are subsequently supplied to further devices, such as the base station BS or the base station controller BSC.

The above-described method and apparatus are illustrative of the principles of the present invention. Numerous modifications and adaptations thereof will be readily apparent to those skilled in this art without departing from the spirit and scope of the present invention.

I claim:

1. A method for signal transmission via a radio interface between radio stations of a time division multiple access mobile communication system, comprising:

transmitting a first radio burst in a time slot of said radio interface, performing a transmission-side synchronization of said transmitting of the first radio burst so that the first radio burst arrives at a receiving radio station at a predetermined point in time within the time slot; and transmitting a second radio burst in the time slot containing the first radio burst, but synchronized with transmission of the first radio burst so that the second radio burst is capable of being evaluated separately from the first radio burst.

2. A method according to claim 1, wherein said first radio burst and said second radio burst transmitted in said time slot have the same length.

3. A method according to claim 1, wherein different types of radio bursts are transmitted in the time slot.

4. A method according to claim 1, wherein:

said radio stations comprise a base station and mobile stations, and said first radio burst is a radio burst that is shorter in comparison to other radio bursts.

5. A method according to claim 4, wherein the time division multiple access mobile communication system is a GSM mobile radio telephone network, and wherein the first radio burst is an access burst.

6. A method according to claim 1, wherein said transmitting of the first radio burst and the second radio burst are synchronized so that points in time of arrival of the first and second radio bursts lead to two received radio bursts that essentially do not overlap.

7. A method according to claim 1, wherein said performing of the transmission-side synchronization aligns a point in time of arrival of the first radio burst with a start of the time slot.

8. A method according to claim 1, further comprising reserving the time slot for a packet data transmission method.

9. A method for signal transmission via a radio interface between mobile stations and a base station of a TDMA mobile communication system, comprising:

transmitting a first radio burst that is shorter with respect to other radio bursts as an access burst in a time slot of said radio interface; and performing a transmission-side synchronization of said transmitting of the first radio burst, so that the first radio burst arrives at a receiving radio station at a predetermined point in time within the time slot.

10. A method according to claim 9, performing a synchronization of the transmission wherein said transmitting of the first radio burst and the second radio burst are synchronized so that points in time of the arrival of the first and second radio bursts lead to two received radio bursts that essentially do not overlap.

11. A method according to claim 9, wherein said performing of the transmission-side synchronization aligns a point in time of arrival of the first radio burst with a start of the time slot.

12. A method according to claim 9, further comprising reserving the time slot for a packet data transmission method.

13. A mobile station for a TDMA mobile communication system having a base station and other mobile stations constructed similar to said mobile station, comprising:

a transmitter/receiver for transmitting and receiving radio bursts;

a signal processor to generate at least one of a first radio burst and a second radio burst; and a controller to synchronize and trigger transmission of the first radio burst to result in reception of the first radio burst at the base station at a predetermined point in time within a time slot, so that the base station can interpret the second radio burst sent from one of the other mobile stations in the time slot containing the first radio burst separately from the first radio burst from said mobile station.

14. A mobile station for a TDMA mobile communication system having a base station and other mobile stations constructed similar to said mobile station, comprising:

a transmitter/receiver for transmitting and receiving radio bursts;

a signal processor to generate at least one of a first radio burst, as an access burst shorter than other radio bursts, and a second radio burst; and a controller to synchronize and trigger transmission of the first radio burst to result in reception of the first radio burst at the base station at a predetermined point in time within a time slot, so that the base station can interpret the second radio burst sent from one of the other mobile stations in the time slot containing the first radio burst separately from the first radio burst from said mobile station.

* * * * *